J. MATTHEWS.
Soda-Fountain.
No. 159,431.  Patented Feb. 2, 1875.
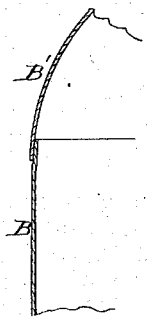
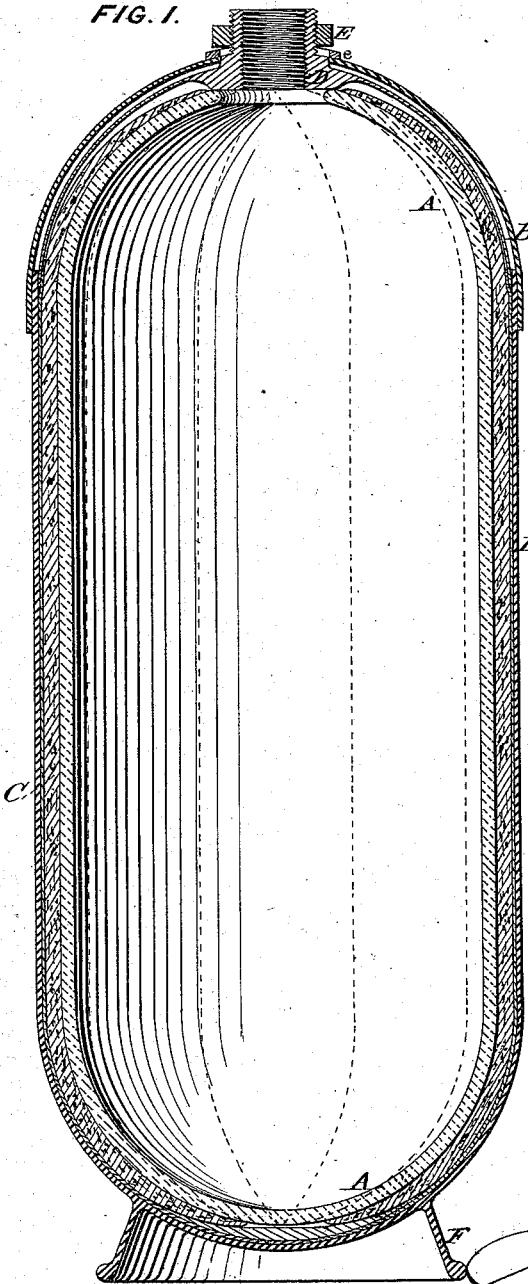
WITNESSES:
INVENTOR:

UNITED STATES PATENT OFFICE.

JOHN MATTHEWS, OF NEW YORK, N. Y.

IMPROVEMENT IN SODA-FOUNTAINS.

Specification forming part of Letters Patent No. 159,431, dated February 2, 1875; application filed August 7, 1874.

CASE A.

*To all whom it may concern:*

Be it known that I, JOHN MATTHEWS, of the city, county, and State of New York, have invented certain new and useful Improvements in Fountains for Soda-Water and other Liquids; and I do hereby declare that the following is a full, clear, and exact description thereof, which will enable others skilled in the art to which it pertains to make and use the same, reference being had to the accompanying drawings, and to the letters of reference marked thereon, which form a part of this specification, in which—

Figure 1 is a longitudinal section, partly in elevation; and Fig. 2, a detail view of the joining of the parts of the shell.

The best and strongest casing or shell for a fountain to contain liquids highly charged with gas is steel or other tough metal. To prevent the corrosion of such fountains it is necessary to line them. The best lining is glass, but heretofore there has been no convenient mode of applying it. Fountains have been constructed with a metallic shell and a glass vessel inside. To prevent the bursting of the glass, a valve or valves were provided in the sides of the glass vessel, so as to equalize the pressure on the inside and outside of the glass vessel.

The object of my invention is to improve the glass-lined soda-fountains—first, by constructing the fountains in such a manner as to make the valves unnecessary; second, to prevent the accumulation of liquid between the exterior of the glass vessel and the exterior jacket or case which sustains the pressure. These objects are accomplished by the method of uniting the interior glass vessel and the exterior strong shell, which is provided with a lining of pure tin, and by filling or packing the space between the glass and metallic vessels with a fibrous or elastic material not subject to decay or to emit any odor, and by applying the solder in joining the shell in a special manner. A suitable material for the purpose of filling is cork, asbestus, spun glass, powdered glass, pulverized minerals, such as mica or other fibrous, vitreous, or mineral material. India-rubber, gutta-percha, and similar gums and resins would answer in special cases, in which their odor does not prove objectionable. The essential thing is that the space between the glass lining shall be evenly packed with a material not liable to ferment or decay, and which will not impart taste or smell to the liquid contained in the fountain.

The following description will enable others to make and use this invention. The glass vessel is produced by blowing it in a mold of such size relative to the steel jacket that about half an inch, more or less, of space is left between the glass vessel and the jacket. A metal lining, preferably pure tin, is made of such size as to fit the jacket closely, and one end is then soldered in the jacket. The packing is then fitted to the end. A block of packing of the material used, with a hole through it, is fitted to the end of the lining where the bung is attached. This block is fitted closely between the glass vessel and the lining when all the packing is adjusted. The use of this block is to prevent small particles of the packing material from washing into the fountain when agitated during use. The rest of the packing is carefully inserted, so as to fill up the whole of the space as nearly as possible. The other head of the lining is then soldered in, and the lining with its contents is then inserted in the steel jacket, in the manner described in my patent for improvement in soda-water fountains, No. 128,411, dated June 13, 1872, or by the following method: In making steel fountains under my former patent, those portions of the steel intended to be joined by the tin-soldering process were protected by a coating of fire-clay or similar material, and only those parts were galvanized which were not joined. This process is attended by some inconvenience in practice, and by considerable expense for labor.

I prepare the joints as follows: I first galvanize or coat with zinc the whole of the sheet-steel intended for the jacket, and then, by means of a blow-pipe, melt tin upon the surface intended to form the joints. This tin alloys itself with the zinc, forming a very fusible alloy, which is carefully wiped off clean. The process is then repeated, until little or no zinc is left upon those portions intended to form the joints. These parts are afterward united by means of tin solder. A very firm joint is formed.

In the drawing, A shows the glass vessel; B, the main portions of the steel jacket, and B' the portion soldered on after all the parts are inserted; C, the fibrous or elastic packing, filling all the space between the shell or jacket and the glass vessel. d is the tin lining, extending all over the inside of the shell, and covering the packing. This lining is soldered to the bung-piece D, which, with nut E and washer e, closes the mouth of the shell. The space shown around the upper portion is to receive the block of packing, so as to prevent any particles of material from entering the glass vessel. F is a foot in supporting the fountain in an upright position.

It is to be observed that the entire pressure acts only on the metal shell, since the top of the glass vessel butts only loosely against the top. The packing between the shell and the glass vessel supports the glass in all parts.

The thick bung-piece D on the inside of the head is sweated to the shell and supports it, so as to give strength at the point weakened at the bung. This piece also gives additional resistance to the wrenching of the bung when screwing in the stop-cocks, as the single thickness would cut into the keys on the bung. Additional washers may be sweated to the inside and the outside, so as to make extra thickness at that point.

I do not claim a steel or metal shell lined with tin or other soft metal, nor a glass vessel within a metallic shell.

I am also aware that fountains have been constructed with metal shell and glass lining and liquid packing between; but,

Having thus described my invention, what I claim, and desire to secure by Letters Patent, is—

1. The improved fountain herein described, for containing aerated beverages, consisting of shell of steel or other strong metal and an inner vessel of glass, with a packing, substantially such as herein described, between all, as and for the purpose set forth.

2. The washers or extra thickness at the bung, in combination with the shell, so as to strengthen and support the shell, as set forth.

In testimony that I claim the foregoing as my own I affix my signature in presence of two witnesses.

JOHN MATTHEWS.

Witnesses:
S. A. CURTIS,
W. D. SLOAN.